United States Patent Office 3,157,646
Patented Nov. 17, 1964

3,157,646
4-CHLORO-3-OXO-PYRIDAZINE-5-AMIDINES
Franz Reicheneder and Karl Dury, Ludwigshafen (Rhine), Adolf Fischer, Mutterstadt, Pfalz, and Herbert Stummeyer, Mannheim, Germany, assignors to Badische Anilin- & Soda-Fabrik Aktiengesellschaft, Ludwigshafen (Rhine), Germany
No Drawing. Filed Oct. 30, 1962, Ser. No. 234,238
Claims priority, application Germany, Nov. 17, 1961, B 64,828
7 Claims. (Cl. 260—240)

It is known to use pyridazone derivatives to influence plant growth. Known compounds for this purpose have the disadvantage, however, that a considerable period elapses after their use before their effect becomes evident.

We have now found that agents which contain a pyridazone of the general formula:

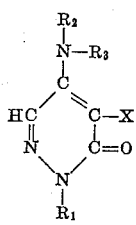

in which X denotes a halogen atom, especially a chlorine atom, $R_1$ denotes a substituted or unsubstituted alkyl, phenyl or cycloalkyl radical, $R_2$ denotes a hydrogen atom or an alkyl radical, $R_3$ denotes a linear or branched alkinyl group, a substituted or unsubstituted nitrogen-containing heterocyclic radical or a substituted or unsubstituted amino radical, or $R_2$ and $R_3$ together denote the radical $=N\equiv N$ or

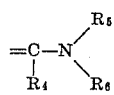

in which $R_4$ denotes a hydrogen atom or a substituted or unsubstituted alkyl or aryl radical, and $R_5$ and $R_6$ denote hydrogen atoms or substituted or unsubstituted alkyl or aryl radicals, $R_5$ and $R_6$ being identical or different, and in which $R_4$ and $R_5$ together with the carbon and nitrogen atoms of which they are substituents may form a heterocyclic ring, or which contain a salt of such a pyridazone, are free from the said disadvantage.

By salts we understand generally salts of inorganic or organic acids, especially strong acids, i.e. acids with high dissociation constants, for example mineral acids, such as hydrochloric acid, sulfuric acid, phosphoric acid, hydrobromic acid, or organic acids, for example, formic acid or acetic acid.

The agents according to this invention have the advantage that they can more easily by emulsified in water than known agents. Furthermore, in the case of the salts, they lend themselves for use in the form of their aqueous solutions because they have good solubility in water.

The agents have good selectivity in respect of weeds among cultivated plants, for example onions or sugar beet, and take effect rapidly, i.e. only a short time after their use. Furthermore their after-effect in the soil is of short duration. Rapid crop rotation is therefore possible. The agents according to this invention may also be used in suitable dosage for the total destruction or inhibition of undesired plant growth. For this purpose they may be used in amounts of about 1 to 10 kg. of active ingredient per hectare.

Agents according to this invention may furthermore be used to achieve other influence on plant growth, especially for dehydration, acceleration of ripening by premature desiccation, for example in potato crops, and also for reducing fruit setting, retarding blossoming, and prolonging the harvest period and storage life.

The agents according to this invention may also be used in suitable concentrations as shoot promoting and root promoting agents.

The new pyridazone derivatives to be used according to this invention may be prepared by methods analogous to conventional methods. For example, reaction of 1-phenyl-4,5-dichloropyridazone with sodium azide in a suitable solvent yields the 4-azido compound (melting point 110° to 111° C.). Analogous reaction with hydrazine hydrate leads to the 4-hydroazino compound (melting point 172° C. with decomposition) which yields with nitrous acid the corresponding azide or with ketones the corresponding hydrazones.

Furthermore, by condensation of 1-phenyl-4-amino-5-chloropyridazone-(6) (which may be obtained by reaction of 1-phenyl-4,5-dichloropyridazone-(6) with ammonia in aqueous solution) with dimethylformamide under the influence of an acid condensing agent, for example, a phosphorus halide or thionyl chloride, phosgene or benzenesulfochloride, the compound N-[4-(1-phenyl-5-chloropyridazone(6)yl)]-N'-dimethylformamidine is obtained. This compound has the following formula:

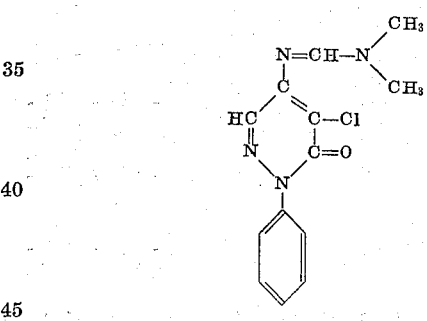

The condensation reaction may if desired be carried out in a solvent, for example, benzene. Analogous condensation of 1-phenyl-4-amino-5-chloropyridazone-(6) with methyl-pyrrolidone gives 1-phenyl-5-chloro-4-(N-methyl-2-pyrrolidinimino)-pyridazone-(6).

The following is a more detailed description of the production of the pyrrolidinimino compound:

20 parts (by weight) of 1-phenyl-4-amino-5-chloro-pyridazone-(6) is added to 100 parts of N-methylpyrrolidone which contains 10 parts of phosgene dissolved therein. The mixture is then slowly heated and boiled under reflux for two hours. The solution is cooled and poured into twice its volume of 2 N aqueous ammonia and the crystals thereby precipitated are separated off. 19 parts of the pyrrolidinimino compound is obtained; after recrystallization from methanol, it melts at 121° to 122° C.

The hydrochloride has the melting point 230° C. after recrystallization from acetonitrile.

1 - phenyl - 5 - chloro - 4 - (N - methyl - 2 - pyrrolidinimino)-pyridazone-(6) has the following structural formula:

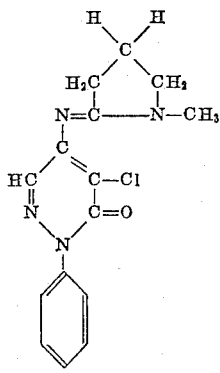

The following are further examples of compounds which may be used according to this invention:

N - [4 - (1 - phenyl - 5 - chloropyridazone(6)yl)] - N' - dimethylformamidine, melting point, 162°–163° C.

N - [4 - (1 - phenyl - 5 - chloropyridazone(6)yl)] - N' - dimethylformamidine hydrochloride, melting point, 203°–205° C.

N - [4 - (1 - phenyl - 5 - chloropyridazone(6)yl)] - N' - dimethylformamidine hydrobromide, melting point, 227°–229° C.

1-phenyl-4-azido-5-chloropyridazone, melting point, 110°–111° C.

1-phenyl-4-hydrazino-5-chloropyridazone (with decomposition), melting point, 172° C.

1-phenyl-4-hydrazino-5-chloropyridazone hydrochloride (with decomposition), melting point, 150° C.

Acetone - 4 - [1 - phenyl - 5 - chloropyridazone - (6) - yl]hydrazone, melting point, 120°–121° C.

Methyl - ethyl - ketone - 4 - [1 - phenyl - 5 - chloropyridazone-(6)yl]hydrazone, melting point 107°–109° C.

Methyl - ethyl - ketone - 4 - [phenyl - 5 - chloropyridazone-(6)yl]hydrazone hydrochloride, melting point, 135°–137° C.

1 - cyclohexyl - 4 - hydrazino - 5 - chloropyridazone - (6) (decomposition), melting point, 148° C.

1 - methyl - 4 - hydrazino - 5 - chloropyridazone - (6) (decomposition), melting point, 153° C.

N - [4 - (1 - phenyl - 5 - chloropyridazone - (6) - yl)] - N'-pyrrolidino-formamidine, melting point, 152°–153.5° C.

N - [4 - (1 - phenyl - 5 - chloropyridazone - (6) - yl)] - N'-pyrrolidino-acetamidine, melting point, 169°–171° C.

N - [4 - (1 - phenyl - 5 - chloropyridazone - (6) - yl)] - N'-morpholino-acetamidine, melting point, 160°–161° C.

N - [4 - (1 - phenyl - 5 - chloropyridazone - (6) - yl)] - N'-piperidino-propionamidine, melting point 128°–130° C.

The form in which the agents according to this invention are used depends entirely on the particular application. The following for example are suitable: solutions of the salts in water, these salts being either salts of physiologically inert acids or salts of acids which themselves have a phytotoxic effect; the free compounds may also be used as emulsions, suspensions or solutions in water or organic liquids, for example high boiling range mineral oil fractions or chlorohydrocarbons. The range of applications may be widened by adding substances having bactericidal, fungicidal or plant growth influencing properties, and also by combination with fertilizers.

The invention is illustrated by, but not limited to, the following examples.

*Example 1*

Soil is treated at the rate of 3 and 5 kg. per hectare with N - [4 - (1 - phenyl - 5 - chloropyridazone - (6) - yl)]N' - dimethylformamidine. The active substance is sprayed on the soil as an aqueous dispersion which has been prepared with an addition of a dispersing agent (sodium lignin sulfonate). Seeds of *Sinapis alba* (mustard), *Avena fatua* (wild oats), *Poa annua* (rye grass), *Beta vulgaris* (sugar beet), *Galium aparine* (cleavers), *Allium cepa* (onion), *Daucus carota* (carrots) are sown in the soil thus pretreated. At first the plants develop normally.

Six days later most of the plants begin to blanch from the tips of the leaves. After another three weeks, *Sinapis alba*, *Avena fatua*, *Poa annua*, and *Galium aparine* are practically completely withered. *Beta vulgaris* shows no damage whereas *Allium cepa* is only slightly blanched at the leaf tips.

Salts of the above formamidine, and also 1-phenyl-5-chloro-4-(N-methyl-2-pyrrolidinimino)-pyridazone-(6) and its salts have a similar action.

*Example 2*

1-phenyl-4-amino-5-chloropyridazone-(6) (I) and N-[4-(phenyl-5-chloropyridazone-(6)-yl)]-N'-dimethylformamidine hydrochloride (II) are sprayed at the rate of 3 kg. per hectare, dispersed or dissolved in 1000 liters of water, on the following plants in the greenhouse: *Sinapis alba*, *Avena fatua*, *Poa annua*, *Beta vulgaris*, *Galium aparine* and *Allium cepa*.

After six days it is established that active substance II exhibits a substantially stronger action on individual plants than active substance I. Neither of the active substances damages *Beta vulgaris*.

The results of the experiment are given in the following table in which the numerals have the following meaning:

0=no damage
1=individual leaves have very slight damage
2=slight damage or inhibition of most of the plants
3=marked plants but leaves not withered; whole plants damaged
4=most of the leaves and individual plants withered
5=plants completely destroyed.

| Plant | Active substance I | Active substance II |
|---|---|---|
| Sinapis alba | 4 | 5 |
| Avena fatua | 1 to 2 | 4 to 5 |
| Poa annua | 1 to 2 | 3 to 4 |
| Beta vulgaris | 0 | 0 |
| Galium aparine | 2 | 4 |
| Allium cepa | 0 to 1 | 0 to 1 |

What we claim is:
1. A compound selected from the group consisting of a compound of the formula

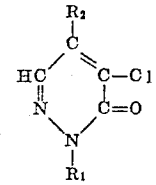

and an acid salt of said compound wherein, in said formula, $R_1$ represents a member selected from the group consisting of lower alkyl, phenyl and cyclohexyl, and $R_2$ represents a member from the group consisting of

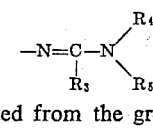

wherein $R_3$ is selected from the group consisting of hydrogen and lower alkyl and $R_4$ and $R_5$ are each lower alkyl;

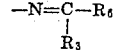

wherein $R_3$ has the significance aforestated and $R_6$ is a member selected from the group consisting of pyrrolidino, morpholino and piperidino; and

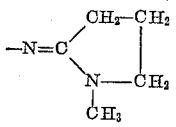

2. N-[4-(1-phenyl-5-chloropyridazon-(6)-yl)]-N'-dimethyl formamidine.

3. N-[4-(1-phenyl-5-chloropyridazon-(6)-yl)]-N'-dimethyl formamidine salt of an acid selected from the group consisting of hydrochloric acid and hydrobromic acid.

4. N-[4-(1-phenyl-5-chloropyridazon-(6)-yl)]-N'-pyrrolidinoformamidine.

5. N-[4-(1-phenyl-5-chloropyridazon-(6)-yl)]-N'-pyrrolidinoacetamidine.

6. N-[4-(1-phenyl-5-chloropyridazon-(6)-yl)]-N'-morpholinoacetamidine.

7. N-[4-(1-phenyl-5-chloropyridazon-(6)-yl)]-N'-piperidinopropionamidine.

References Cited in the file of this patent
FOREIGN PATENTS
1,240,986   France _____ Aug. 1, 1960

UNITED STATES PATENT OFFICE
CERTIFICATE OF CORRECTION

Patent No. 3,157,646            November 17, 1964

Franz Reicheneder et al.

It is hereby certified that error appears in the above numbered patent requiring correction and that the said Letters Patent should read as corrected below.

Column 3, line 39, for "-4-[phenyl-5-" read -- -4-[1-phenyl-5- --.

Signed and sealed this 11th day of May 1965.

(SEAL)
Attest:

ERNEST W. SWIDER
Attesting Officer

EDWARD J. BRENNER
Commissioner of Patents